Feb. 20, 1945.  S. E. HEYMANN  2,370,035
HEATING SYSTEM
Filed Nov. 16, 1942    2 Sheets-Sheet 1
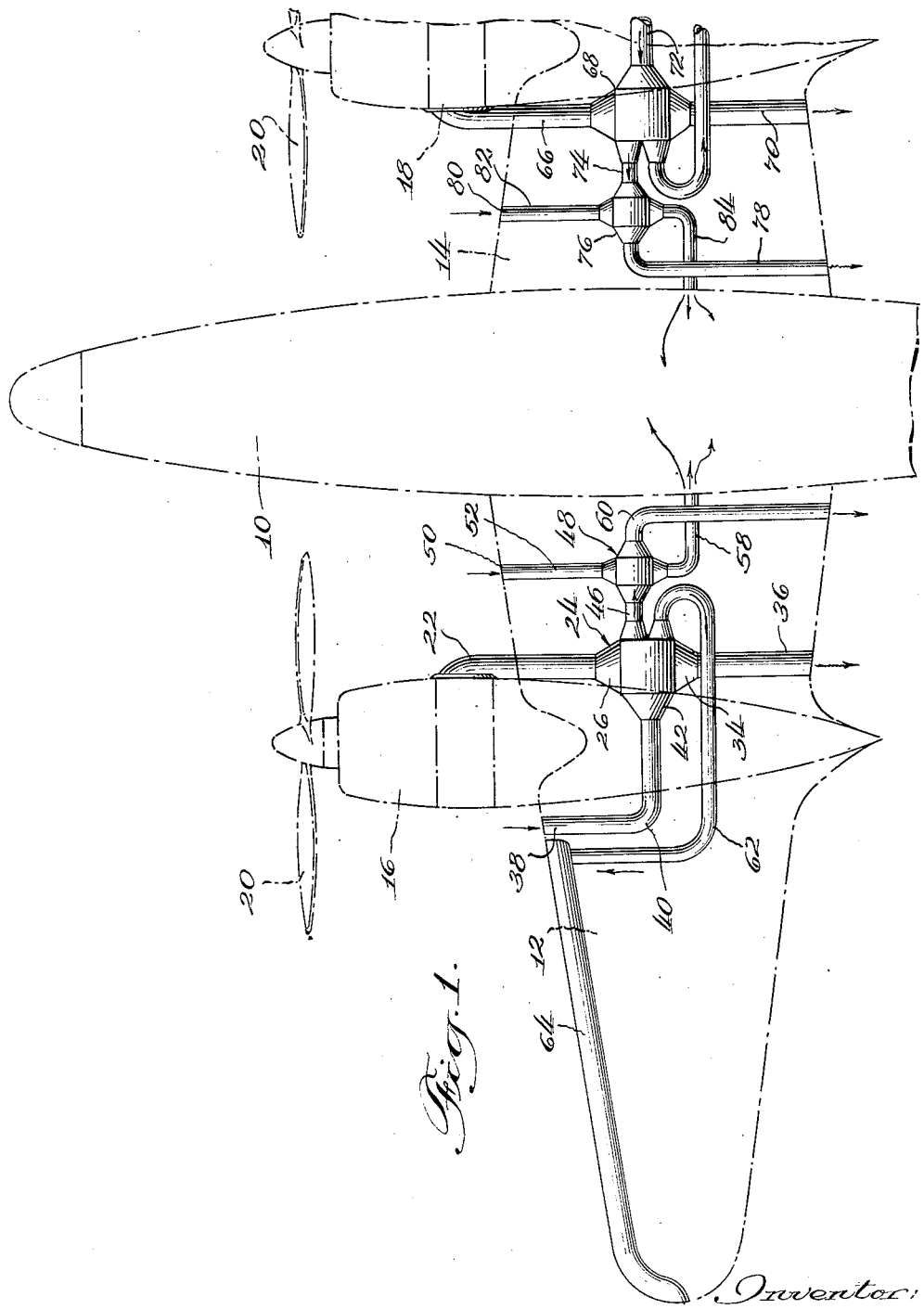

Feb. 20, 1945.  S. E. HEYMANN  2,370,035
HEATING SYSTEM
Filed Nov. 16, 1942  2 Sheets-Sheet 2
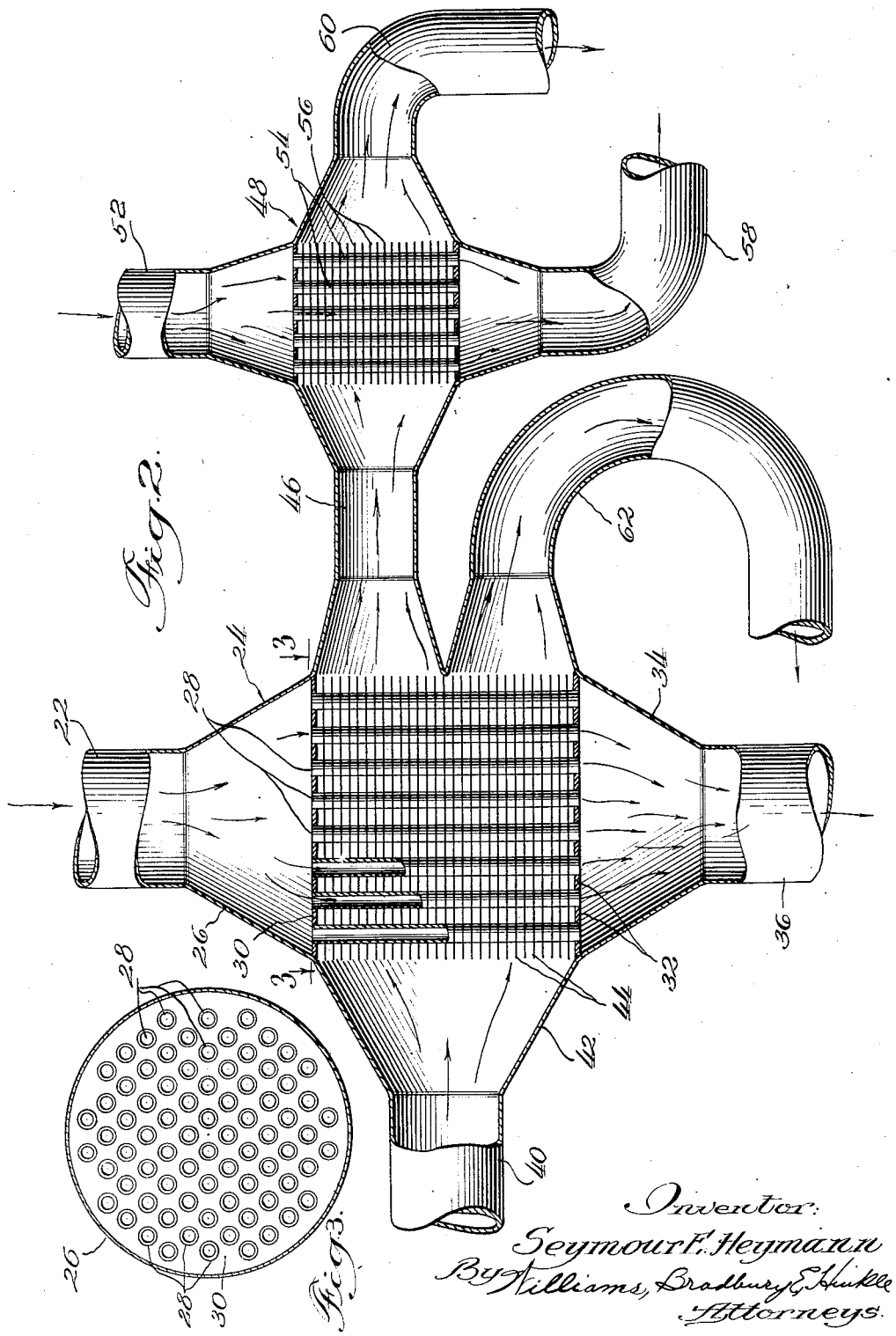
Inventor:
Seymour F. Heymann
By Williams, Bradbury & Hinkle
Attorneys.

Patented Feb. 20, 1945

2,370,035

UNITED STATES PATENT OFFICE 2,370,035

HEATING SYSTEM

Seymour E. Heymann, Chicago, Ill., assignor to Stewart-Warner Corporation, Chicago, Ill., a corporation of Virginia Application November 16, 1942, Serial No. 465,674

5 Claims. (Cl. 244—118)

My invention relates to heating systems and more particularly to heating systems for airplanes.

In airplanes, the exhaust gases discharged by the engine or engines which drive the airplane contain great quantities of heat and an object of my invention is to provide a new and improved heating system for utilizing this heat to prevent icing of the airplane wings and to heat the cabin and any other enclosed space or spaces formed in the body of the airplane.

Another object of my invention is to provide a new and improved heating system having a minimum number of parts and which effectively prevents the leakage of any exhaust gases into the cabin or other enclosed space of the airplane.

Another object of my invention is to provide a new and improved heating system which is of minimum weight and has a high thermal efficiency.

Another object of my invention is to provide a new and improved heating system which utilizes the natural characteristics of a primary heat exchanger for supplying heated air at different temperatures from the same source of heat.

Other objects and advantages will become apparent as the description proceeds.

In the drawings:

Fig. 1 is a somewhat diagrammatic top plan view of an airplane having a preferred form of my invention applied thereto;

Fig. 2 is a view showing a horizontal section through one of the primary and secondary heat exchangers and associated ducts;

Fig. 3 is a vertical, sectional view of a primary heat exchanger and is taken on the line 3—3 of Fig. 2.

In Fig. 1 of the drawings, I have illustrated a conventional airplane having a body 10 and wings 12 and 14. The particular airplane selected for purposes of illustration is of the two engine type and has engines 16 and 18 mounted, respectively, on the wings 12 and 14. These engines drive conventional propellers 20. While the drawings illustrate my invention as being applied to a particular type of airplane, my invention is not limited to such a plane, but is capable of being applied to any plane driven by an internal combustion engine or otherwise provided with a source of hot gases from which heat may be readily extracted.

The engine 16 has an exhaust pipe 22 leading to a primary heat exchanger 24. As more clearly shown in Fig. 2, the primary heat exchanger 24 has a conical inlet 26 which conducts the exhaust gases from the engine 16 to a plurality of tubes 28 extending between the headers 30 and 32. After the exhaust gases have passed through the tubes 28, they pass into the tapered outlet 34 and are discharged to atmosphere through the tail pipe 36.

A ram 38 supplies air at atmospheric temperature to an inlet pipe 40 leading to the heat exchanger 24. The pipe 40 conducts the atmospheric air to the tapered air inlet 42 of the heat exchanger 24 and from this inlet the atmospheric air passes between and around the tubes 28 and between the sheet metal fins 44 which surround these tubes and assist in transferring heat to the in-coming air. That part of the air which comes in contact with those portions of the tubes 28 and fins 44, which are adjacent the inlet ends of these tubes, is heated to a higher temperature than that part of the air which contacts the tubes and fins adjacent the outlet ends of these tubes.

The more highly heated primary air passes into a duct 46 leading to a secondary heat exchanger 48 where the highly heated air gives up its heat to ventilating air supplied to the heat exchanger 48 by ram 50 and inlet pipe 52. The ventilating air entering the heat exchanger 48 absorbs heat from the walls of tubes 54 through which this ventilating air flows. These tubes are surrounded by sheet metal fins 56 which facilitate the transfer of heat from the highly heated primary air delivered by duct 46 to the ventilating air supplied by the ram 50.

The heated ventilating air flows from the secondary heat exchanger 48 into a delivery pipe 58 which conducts this heated ventilating air to the cabin 10. The delivery pipe 58 may be connected to any suitable arrangement of ducts for distributing this ventilating air throughout the cabin or body of the plane and to the various enclosed spaces or compartments formed therein. After the heated primary air has given up its heat to the ventilating air in the secondary heat exchanger 48, this primary air is discharged to atmosphere through outlet pipe 60.

That portion of the air delivered to the primary heat exchanger which comes in contact with the colder portion of this heat exchanger and, therefore, receives less heat therefrom, passes into a pipe 62 connecting with the inlet end of a duct arrangement 64 extending along the leading edge of the wing 12. This duct arrangement distributes this heated air in such manner as to prevent the formation of ice on the leading edge of this wing. The duct arrangement 64 may be similar to that disclosed in the application of Henry J. DeN. McCollum, Serial No. 436,091, filed March 25, 1942, or may be of any other suitable type.

The engine 18 has an exhaust pipe 66 leading to a primary heat exchanger 68 which may be identical with the heat exchanger 24. The exhaust gases are discharged to atmosphere through a tail pipe 70 after they have given up the desired amount of heat to air supplied to the primary heat exchanger 68 through an inlet pipe 72 connected to a ram which is not shown but which may correspond to the ram 50.

That part of the air supplied to the primary heat exchanger 68 and which is heated to the highest temperature by this heat exchanger, flows through a duct 74 to a secondary heat exchanger 76 which may correspond to the heat exchanger 48. This air gives up its heat in this heat exchanger and then flows to atmosphere through outlet pipe 78. Ram 80 and inlet pipe 82 supply ventilating air to the secondary heat exchanger 76 and after this ventilating air has been heated by the secondary heat exchanger, it flows through delivery pipe 84 to the body or cabin 10 of the airplane. The delivery pipe 84 may discharge directly into the cabin 10 or into any enclosed space or compartment formed therein, or may be connected to a duct system which distributes it to various points in the body of the plane.

My invention may utilize other types of heat exchangers than those shown in the drawings and may be applied to planes having any desired number of engines and cabins in various arrangements. In the particular form shown, air heated by the exhaust from two engines is utilized to heat a single cabin or body and in a single engine plane, of course, the heat from only one exhaust would be available for this purpose. Where the plane has two or more engines, the exhaust from a single engine may be utilized to heat the leading edge of all wings and all cabin space or the exhaust from any number of engines may be utilized for this purpose.

In the operation of the embodiment shown, the hot exhaust gases from the engines pass through the primary heat exchangers and give up large quantities of heat to atmospheric air supplied by the rams 50 and 80. That portion of this air which passes over the hottest part of the heat exchangers is directed into secondary heat exchangers where it gives up heat for ventilating air for the airplane cabin. The remaining portion of the atmospheric air delivered to the primary heat exchangers comes in contact with the cooler portions of these heat exchangers and is heated less than the air supplied to the secondary heat exchangers. The cooler air leaving the primary heat exchangers is utilized to heat the leading edges of the wings to prevent the accumulation of ice and snow thereon.

An important feature of my invention resides in the fact that it is almost impossible for any exhaust gas to become mixed with the ventilating air which is furnished to the airplane cabin. If there should be a leak in a primary heat exchanger which would permit some of the exhaust gases to mix with the hot primary air supplied to the secondary heat exchangers, the latter would prevent the polluted primary air from mixing with the ventilating air. Even if leakage should also occur in the secondary heat exchangers, the proportion of exhaust gas which would mix with the ventilating air would be too small to affect the passengers in the airplane cabin. The airplane passengers are thus protected by my invention against the injurious effects from the exhaust gases under all possible operating conditions.

Another important feature of my invention lies in the utilization of the primary heat exchangers to supply hot air at different temperatures and suitable for different purposes. The hot air supplied by the primary heat exchangers for de-icing purposes is at a much lower temperature than the hot air supplied by these heat exchangers for heating the ventilating air delivered to the airplane cabin. This dual function of the primary heat exchangers is accomplished by a simple structure having a minimum number of parts and utilizes an inherent characteristic of this type of heat exchanger.

My novel heating system requires no motors or other moving parts and the various structural elements of this system may conform to well known practice and lend themselves to inexpensive manufacture by conventional methods and equipment. Furthermore these elements are compact and efficient and may be composed of lightweight material.

While I have illustrated and described in detail only a single embodiment of my invention, it is to be understood that my invention is not limited to the details shown and described, but may assume numerous other forms and that my invention is to include all variations and modifications coming within the scope of the appended claims.

I claim:

1. A heating system for airplanes having wings and cabins comprising a primary heat exchanger adapted to be supplied with hot exhaust gases from an internal combustion engine, said heat exchanger having a hot part and a cool part, means for supplying air to said heat exchanger to be heated to different temperatures by said heat exchanger, a wing de-icer for preventing the formation of ice and snow on the leading edge of a wing, means connected to said cool part for conducting air heated to a relatively low temperature by said heat exchanger to said wing de-icer, means connected to said hot part for conducting air heated to a relatively high temperature by said heat exchanger to a second heat exchanger, means for supplying said heat exchanger with ventilating air, and means for delivering heated ventilating air from said second heat exchanger to an airplane cabin.

2. A heating system for airplanes having wings and cabins comprising a primary heat exchanger having a hot part and a cool part, means for supplying hot exhaust gases to said heat exchanger, means for supplying air to said heat exchanger, to be heated to different temperatures by said heat exchanger, a de-icer, means connected to said cool part for conducting air heated to a relatively low temperature by said heat exchanger to said de-icer to prevent the formation of ice and snow on a leading edge of a part of the airplane, means connected to said hot part for conducting air heated to a relatively high temperature by said heat exchanger to a second heat exchanger, means for supplying said second heat exchanger with ventilating air, and means for delivering heated ventilating air from said second heat exchanger to an airplane cabin.

3. A heating system for airplanes comprising a primary heat exchanger adapted to be supplied with hot exhaust gases from an internal combustion engine, said heat exchanger having a hot part and a cool part, a ram for supplying air to said heat exchanger to be heated to different temperatures by said heat exchanger, a wing de-icer, a pipe connected to said cool part for conducting air heated to a relatively low temperature by said heat exchanger to said wing de-icer adjacent the leading edge of a wing of the airplane to prevent the formation of ice and snow thereon, a pipe connected to said hot part for conducting air heated to a relatively high temperature by said heat exchanger to a second heat exchanger, a ram for supplying said second heat exchanger with ventilating air, and a pipe for delivering heated ventilating air from said second heat exchanger to an airplane cabin.

4. A heating system for airplanes comprising a primary heat exchanger adapted to be supplied with hot exhaust gases from an internal combustion engine, said heat exchanger having a hot part and a cool part, means for supplying air to said heat exchanger to be heated thereby, a wing de-icer, means connected to said cool part for conducting air heated by said heat exchanger to said wing de-icer at the leading edge of a wing of the airplane to prevent the formation of ice and snow thereon, means connected to said hot part for conducting air heated by said heat exchanger to a second heat exchanger, means for supplying said second heat exchanger with ventilating air, and means for delivering heated ventilating air from said second heat exchanger to an airplane cabin.

5. A heating system for an aircraft having an internal combustion engine, a wing, and a cabin comprising in combination a primary heat exchanger having a plurality of gas conducting tubes enclosed in a housing and fins surrounding said tubes, means for supplying exhaust gases from said engine to one end of said tubes, means for supplying primary air to said housing to be heated by heat extracted from said exhaust gases, means for receiving primary air which has come in contact with said tubes adjacent their inlet ends, a second heat exchanger connected to said pipe, said second heat exchanger including tubes located in a casing and surrounded by heat transfer fins, means for supplying secondary air to said second heat exchanger, means for conducting said secondary air to a cabin, a de-icing arrangement at the leading edge of a wing and a pipe for receiving primary air from said primary heat exchanger and which has contacted the tubes therein adjacent their outlet end, said last-named pipe being connected to said de-icing arrangement.

SEYMOUR E. HEYMANN.